US007031911B2

(12) United States Patent
Zhou et al.

(10) Patent No.: US 7,031,911 B2
(45) Date of Patent: Apr. 18, 2006

(54) SYSTEM AND METHOD FOR AUTOMATIC DETECTION OF COLLOCATION MISTAKES IN DOCUMENTS

(75) Inventors: Ming Zhou, Beijing (CN); Ting Liu, Harbin (CN)

(73) Assignee: Microsoft Corporation, Redmond, WA (US)

( * ) Notice: Subject to any disclaimer, the term of this patent is extended or adjusted under 35 U.S.C. 154(b) by 809 days.

(21) Appl. No.: 10/185,430

(22) Filed: Jun. 28, 2002

(65) Prior Publication Data

US 2004/0006466 A1 Jan. 8, 2004

(51) Int. Cl.
*G06F 17/21* (2006.01)

(52) U.S. Cl. .................. 704/10; 704/2; 704/4; 704/9; 707/102

(58) Field of Classification Search ................ 704/9, 704/4, 2, 10, 251, 277, 257, 243; 707/102
See application file for complete search history.

(56) References Cited

U.S. PATENT DOCUMENTS

| | | | | |
|---|---|---|---|---|
| 4,831,529 A | * | 5/1989 | Miike et al. ............. | 704/4 |
| 4,868,750 A | * | 9/1989 | Kucera et al. ........... | 704/8 |
| 5,384,701 A | * | 1/1995 | Stentiford et al. ........ | 704/3 |
| 5,528,491 A | * | 6/1996 | Kuno et al. ............. | 704/9 |
| 5,644,774 A | * | 7/1997 | Fukumochi et al. ....... | 704/4 |

OTHER PUBLICATIONS

Yuseop Kim, Byoung-Tak Zhang and Yung Taek Kim, "Collocation Dictionary Optimization Using WordNet and k-Nearest Neighbor Learning," Machine Translation, vol. 16, No. 2, pp. 89-108, 2001.
C.-C. Shei and Helen Pain, "An ESL Writer's Collocational Aid", Computer Assisted Language Learning, vol. 13, No. 2, pp. 167-182, Apr. 2000.
Sayori Shimohata, Toshiyuki Sugio, and Junji Nagata, "Retrieving Domain-Specific Collocations by Co-Occurrences and Word Order Constraints", Computational Intelligence Conference: An International Journal, vol. 15, No. 2, pp. 92-100, May 1999.
Masahiko Haruno and Satoru Ikehara, "Tow-Step Extraction of Bilingual Collocations by Using Word-Level Sorting", IEICE Transactions on Information and Systems, vol. E81-D, No. 10, pp. 1103-1110, Oct. 1998.
Nari Kim and Yung Taek Kim, "Determining Target Expression Using Parameterized Collocations From Target Corpus in Korean-English Machine Translation", PRICAI-94, Proceedings of the 3rd Pacific Rim International Conference on Artificial Intelligence, vol. 2, pp. 732-736, Aug. 1994.

* cited by examiner

*Primary Examiner*—W. R. Young
*Assistant Examiner*—Minerva Rivero
(74) *Attorney, Agent, or Firm*—Westman, Champlin & Kelly, P.A.

(57) ABSTRACT

A method and computer-readable medium are provided that construct a collocation mistake pattern database for use in writing in a first language by a person whose native language is a second language. The method includes obtaining a bilingual corpus having sentences in first and second languages and extracting second language word pairs from the second language sentences in the corpus. For each second language word pair extracted from the corpus, a corresponding first language word pair is extracted from the corresponding first language sentence in the corpus to determine a correct first language translation for the second language word pair. Also, for each second language word pair extracted from the corpus, a set of combinations of first language translation words corresponding to the second language word pair is created. Finally, for each second language word pair extracted from the corpus, the correct first language translation is removed from the set of combinations of first language translation words such that the set of combinations represent a set of collocation mistake first language word pairs corresponding to the second language word pair.

17 Claims, 6 Drawing Sheets

SYSTEM AND METHOD FOR AUTOMATIC DETECTION OF COLLOCATION MISTAKES IN DOCUMENTS

BACKGROUND OF THE INVENTION

The present invention relates to machine aided writing systems and methods. In particular, the present invention relates to systems and methods for aiding users in writing in non-native languages.

With an ever increasing global economy, and with the rapid development of the Internet, people all over the world are becoming increasingly familiar with writing in a language which is not their native language. Unfortunately, for some societies that possess significantly different cultures and writing styles, the ability to write in some non-native languages is an ever-present barrier. When writing in a non-native language (for example English), language usage mistakes are frequently made by the non-native speakers (for example, people who speak Chinese, Japanese, Korean or other non-English languages). These kind of mistakes can include both grammatical mistakes and improper usage of collocations such as verb-object, adjective-noun, adverb-verb, etc.

Many people have the ability to write in a non-native language using proper grammar, but they still may struggle with mistakes in collocations between two the words. Still others struggle with both grammar and other mistakes such as collocations between two words. While spell checking and grammar checking programs and systems are useful in correcting grammatical mistakes, detection and/or correction of mistakes in collocations between two words can be difficult, particularly since these mistakes can be otherwise grammatically correct. Therefore, grammar checkers typically provide very little assistance, if any, in detecting mistakes relating to the collocation between words. English is used as an example of the non-native language in the following discussion, but these problems persist across other language boundaries.

For example, consider the following sentences which contain collocation mistakes which cause the sentences to not be native-like English, even if otherwise grammatically correct.

1. Open the light.
2. Everybody hates the crowded traffic on weekends.
3. This is a check of US$ 500.
4. I congratulate you for your success.

The native-like English versions of these sentences should be like:

1. Turn on the light.
2. Everybody hates the heavy traffic on weekends.
3. This is a check for US$ 500.
4. I congratulate you on your success.

As an example of the barriers faced by non-native English speaking peoples, consider the plight of the Chinese user. By culture, background and thinking habits, Chinese people often produce English sentences which may be grammatical, but not natural. For example, Chinese people tend to directly translate subjects in Chinese into subjects in English, and do the same with objects and verbs. When writing in English, Chinese people often experience difficulty in deciding the collocations between verbs and prepositions, adjectives and nouns, verbs and nouns, etc. Moreover, in specific domains like the business domain, special writing skills and styles are needed.

Common dictionaries are mainly used by non-native speakers for the purpose of reading (a kind of decoding process), but these dictionaries do not provide enough support for writing (a kind of encoding process). They only provide the explanation of a single word, and they typically do not provide sufficient information to explain relevant phrases and collocations. Moreover, there is no easy way to get this kind of information from dictionaries, even if some of the information is provided in the dictionaries. On the other hand, current widely used grammar checking tools have some limited ability in detecting apt-to-make grammatical mistakes, but are not able to detect the collocation mistakes.

Although the aforementioned problems are described with reference to English language writing by native Chinese speaking people, these problems are common for people who are writing in a first (non-native) language, but who are native speakers of a second (native) language. In light of these problems, a system or method which aids non-native speakers in preparing documents without collocation mistakes would be a significant improvement in the art. Further, an improved method of constructing a collocation mistake pattern or template database, for use by such a system or method would be a significant improvement.

SUMMARY OF THE INVENTION

A method and computer-readable medium are provided that construct a collocation mistake pattern database for use in writing in a first language by a person whose native language is a second language. The method includes obtaining a bilingual corpus having sentences in first and second languages and extracting second language word pairs from the second language sentences in the corpus. For each second language word pair extracted from the corpus, a corresponding first language word pair is extracted from the corresponding first language sentence in the corpus to determine a correct first language translation for the second language word pair. Also, for each second language word pair extracted from the corpus, a set of combinations of first language translation words corresponding to the second language word pair is created. Finally, for each second language word pair extracted from the corpus, the correct first language translation is removed from the set of combinations of first language translation words such that the set of combinations represent a set of collocation mistake first language word pairs corresponding to the second language word pair.

DETAILED DESCRIPTION OF ILLUSTRATIVE EMBODIMENTS

The invention is directed toward systems and methods which detect typical language usage mistakes frequently made by non-native speakers of the language being written in. The invention includes systems and method for constructing a collocation mistake database for use in this process. The invention is described with reference to people whose native language is not English. (Chinese, Japanese, Korean, etc.), but who are writing in English. However, the invention applies to similar problems persisting across other language boundaries. These kinds of mistakes include improper usage of collocations such as verb-object, adjective-noun, adverb-verb, etc. Unlike the spelling check and grammar check used widely in word processing systems, the present invention focuses on detection of mistakes in collocations between two words. These mistakes can be grammatical or non-grammatical.

Figure 1:
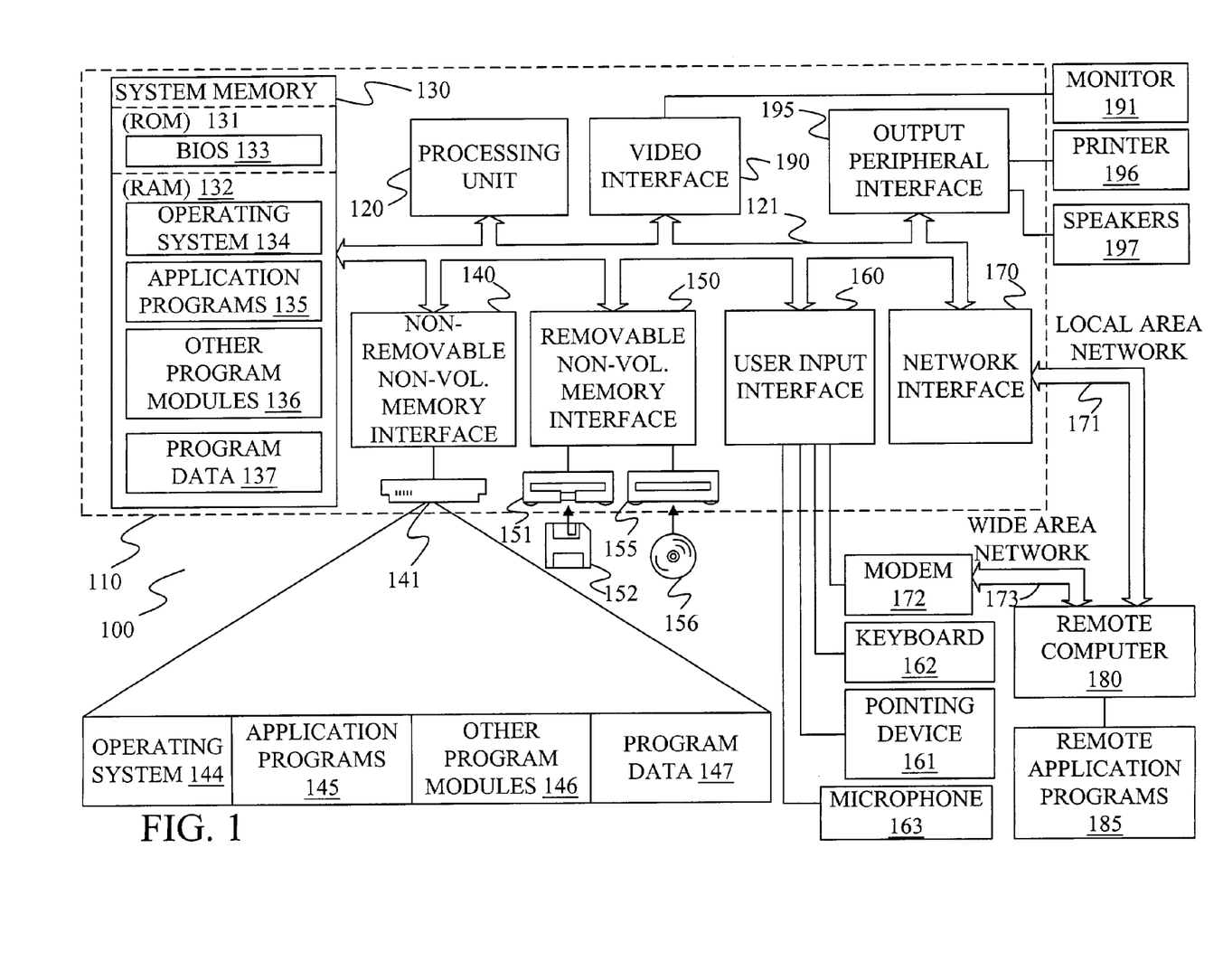
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
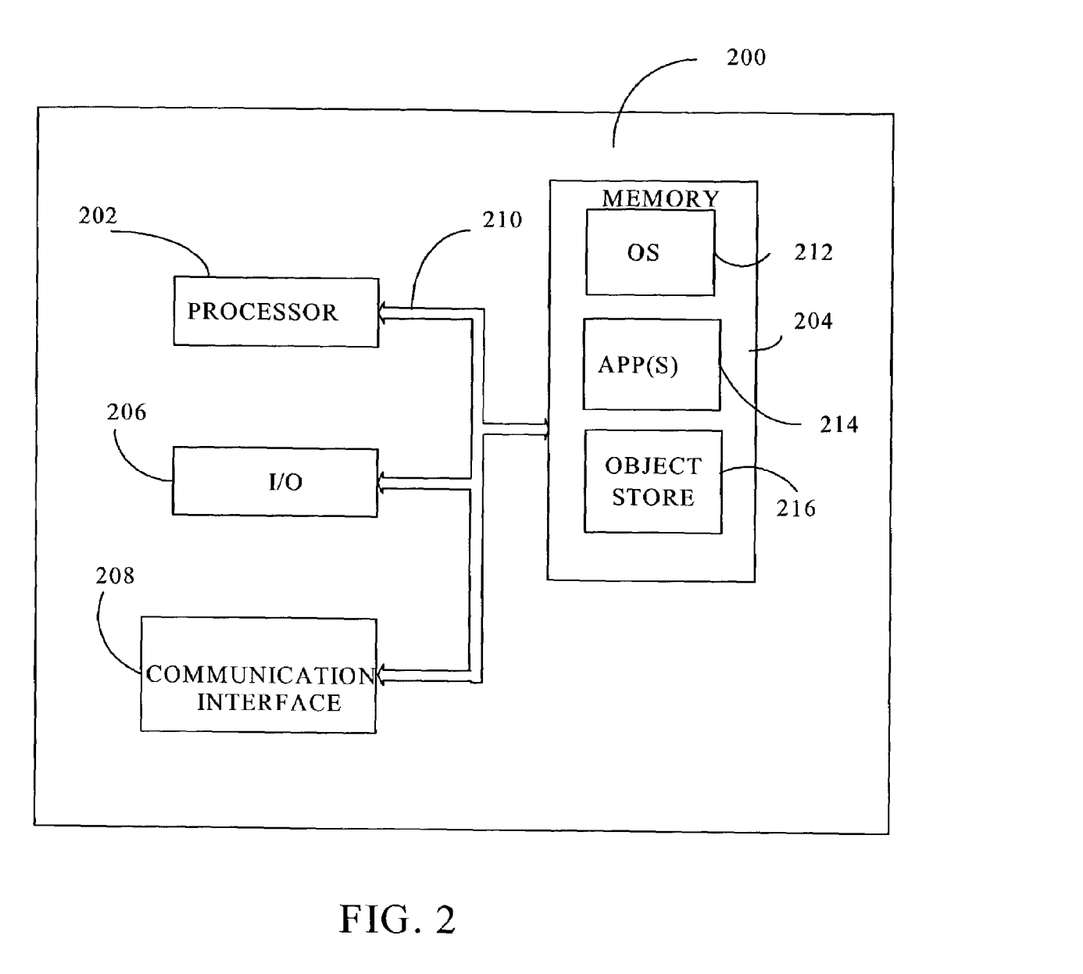
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

In accordance with various aspects of the present invention, proposed are systems and methods for automatically detecting collocation mistakes in documents written in a first language (for example English) by a user for whom the first language is a non-native language (for example a Chinese user or, more generally, a user whose native language is a second language different than the first language). Under one aspect of the invention, an improved method of constructing a collocation mistake detection/suggestion pattern database is disclosed. Under another aspect of the present invention, a matching algorithm and the database are used to detect collocation mistakes in the written document and to provide suggestions for correcting the collocation mistakes.

1. Construction of a Detection/Suggestion Pattern Database

The database construction or acquisition process is supported with the use of a large sentence aligned bilingual corpus (Chinese-English in this example). The Chinese sentences in the bilingual corpus are parsed in order to get the dependency structure between words. For the Chinese words in the corpus, word alignment techniques are used to determine their correct English translation words from the corresponding English sentences in the corpus. Word pairs of specified dependency-structures and their corresponding translations are then extracted. For example, all of the pairs of words having verb-object dependency and adjective-noun relation, as well as their corresponding English translations, can be extracted from the corpus. An example is shown in Table 1.

TABLE 1

| Dependency relations | Explanation | Examples |
|---|---|---|
| Verb-Object | Contains Chinese word pair of verb and its object, and its English translation | 开 + 灯 turn on + the light |
| Adjective-Noun | Contains Chinese word pair of subject and its predicate, and its English translation | 拥挤的 + 交通 heavy + traffic |

In this way, a large database describing Chinese phrases and their correct translations can be obtained. The correspondence between Chinese word pairs and their correct English language translations are annotated. The English words by are then replaced by the various possible English translations of the corresponding Chinese words. For each Chinese word pair of the particular dependency structure, all possible combinations of the English translation words, except for the combination corresponding to the correct translation identified using sentence and word alignment, are saved in the mistake pattern database.

Figure 3:
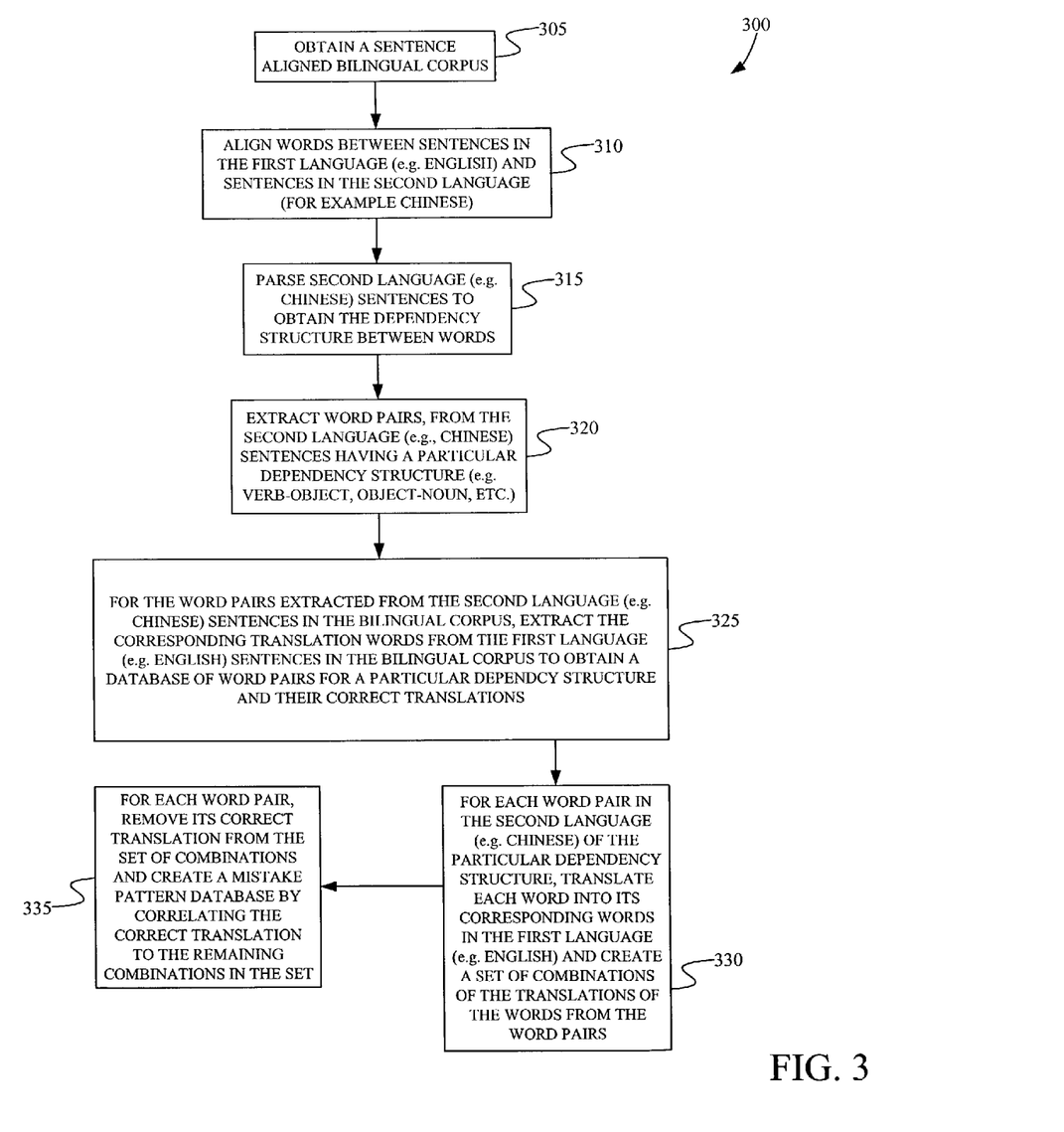
FIG. 3 is a flow diagram illustrating a method of constructing a mistake pattern or template database for use in correcting collocation mistakes.

The process of constructing a collocation mistake pattern database, which is described generally above, is illustrated in greater detail in the flow diagram 300 shown in FIG. 3. The method of constructing a mistake pattern database is illustrated in FIG. 3 both generically with reference to construction of a database which aids in the process of writing in a first language by native speakers of a second language, and more specifically, with reference to construction of a database which aids native Chinese speaking people in correcting collocation mistakes while writing in English.

As shown at 305, a sentence aligned bilingual corpus is obtained. Generally, a large bilingual corpus is more useful in generating the collocation mistake pattern database than would be a smaller corpus. Also, the bilingual corpus should be sentence aligned to allow correlation of the words and phrases contained in each sentence for the two languages. The sentence aligned bilingual corpus can be either constructed using existing techniques, or it can be obtained from other sources.

Then, word alignment techniques are used to align words or phrases between sentences in the first language (for example English) and sentences in the second language (for example Chinese), as shown at 310. Steps 305 and 310 can be combined in various embodiments, so long as a sentence and word aligned bilingual corpus is created or obtained. Word alignment between the sentences in the first language (e.g., English) and sentences in the second language (e.g., Chinese) can be accomplished using any of a wide variety of word alignment technologies or techniques. Generally, these techniques correlate words or groups of words in sentences in the first language with corresponding words or groups of words in sentences of the second language within the bilingual corpus. A brief discussion of an example word alignment technique is provided with reference to FIG. 4, but the methods of the present invention are not limited to any particular word alignment technique.

Figure 4:
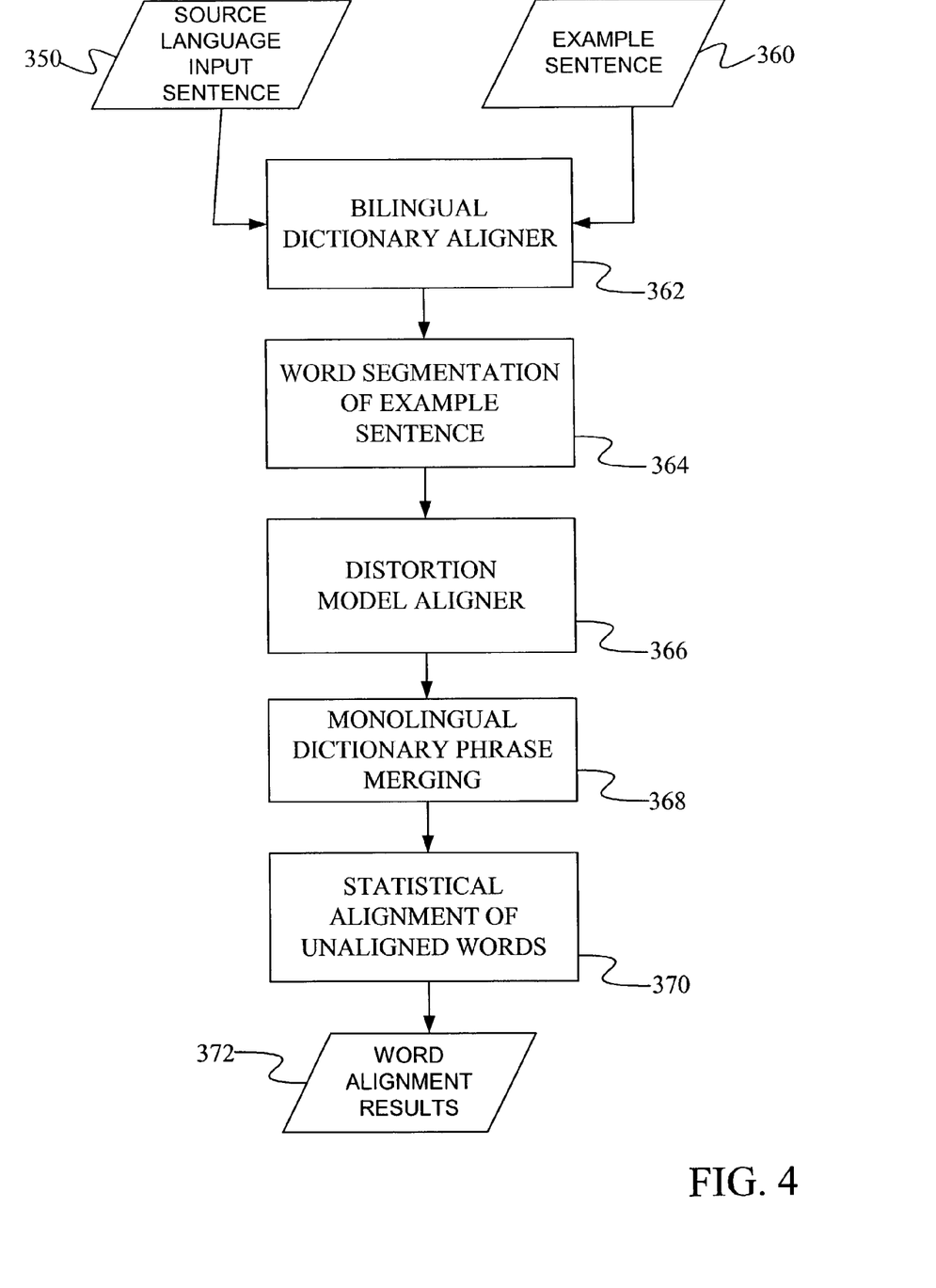
FIG. 4 is a data flow diagram illustrating word alignment.

Referring for the moment to FIG. 4, shown is a data flow diagram illustrating a word alignment technique which can be used in some embodiments of the present invention. FIG. 4 shows that in one word alignment process, the source language input sentence 350 and an example under consideration 360 are input to a first alignment component which operates as a bilingual dictionary aligner 362. Aligner 362 describes how two words in different languages can possibly be translated into one another. There are a wide variety of different ways in which this has been done. Some metrics for evaluating this type of translation include a translation probability such as that found in Brown et al., *The Mathematics of Statistical Machine Translation: Parameter Estimation,* Computational Linguistics, 19(2), pp. 263–311 (1993), a dice coefficient such as that found in Ker et al., *A Class-based Approach to Word Alignment,* Computational Linguistics Vol. 23, Num. 2, pp. 313–343 (1997), mutual information such as that found in Brown, P. F., *A Statistical Approach to Language Translation,* COLING-88, Vol. 1, pp. 71–76 (1998), and t-score such as that found in Pascale, *A Pattern Matching Method for Finding Noun and Proper Noun Translation From Noisy Parallel Corpora,* Computational Linguistics, 21(4), pp. 226–233 (1995).

Bilingual dictionary aligner 362 thus establishes high confidence single word anchor points which are direct word translations from source language input sentence 350 to example sentence 360. These can be used later during phrase alignment.

Next, in cases where example sentence 360 is in a non-segmented language (such as Chinese) example sentence 360 undergoes word segmentation. This can be done in any of a wide variety of different, known ways and the present invention is not limited to any specific word segmentation technique. Word segmentation of the example sentence 360 is indicated by block 364 in FIG. 4.

A distortion model aligner 366 is then employed. Distortion model aligner 366 describes how likely one position in the source language sentence 350 can be aligned to another position in the target language example sentence 360. As with the bilingual dictionary aligner 362, there are a wide variety of different distortion model aligners 366 which can be employed. Some such models include absolute distortion (such as in Brown, cited above), relative offset (such as in Brown), hidden markoff model (HMM)-based systems and structure constraint systems (also found in Brown).

Even after word alignment and distortion modeling, there is still likely to be some unaligned portions of the input sentence. Therefore, a monolingual dictionary is accessed to merge characters into words and words into phrases. This is indicated by block 368 in FIG. 4. In other words, even if the bilingual dictionary is very large, its coverage is still very limited because of the basic complexity of language. Using a monolingual dictionary, some separate words (that should not be separate because they are part of a phrase) can be identified as a phrase. Thus, phrase merging is implemented.

Similarly, any known statistical alignment component can be used in an effort to align unaligned words. This is indicated by block 370. Such statistical alignment techniques are known and are simply provided with a threshold to constrain the statistical alignment space.

Taking all of these items into account, the word alignment results 372 are output by the word alignment system.

While, in the embodiments shown in FIG. 4, the word alignment mechanism includes translation information from bilingual dictionary aligner 362, distortion aligner model 366, phrase merging component 368 and statistical alignment component 370, other sources of information can be used as well. For example, the t-score mentioned above can be used as can contextual information. In any case, the word alignment results 372 can provide anchor points which reflect high confidence alignments between the source language input sentence 350 and example sentence 360. These anchor points can be used during phrase alignment.

Referring now back to FIG. 3, after a sentence and word aligned bilingual corpus is obtained or produced, the sentences in the second language (e.g., Chinese) are dependency parsed to obtain the dependency structures between words in the sentences of the corpus. This is shown at step 315 in FIG. 3. After the dependency structures between words in the second language (e.g., Chinese) sentences in the corpus are identified, word pairs having a particular dependency structure (e.g., verb-object, object-noun, etc.) are extracted from the second language (e.g., Chinese) sentences in the corpus. This is illustrated at step 320 in FIG. 3.

For the word pairs extracted from the second language (e.g., Chinese) sentences in the bilingual corpus, the corresponding translation words are extracted from the first language (e.g., English) sentences in the corpus. For a particular dependency structure, this results in a database of word pairs in the first language, and their correct word pair translations. This is shown in FIG. 3 at 325.

To construct the collocation mistake pattern database, for each word pair in the second language (e.g., Chinese), a set of corresponding collocation mistake word pairs in the first language (e.g., English) must be identified. This is illustrated at 330 in FIG. 3. In order to accomplish this, for each word pair in the second language having a particular dependency structure, translate each word of the word pair into all of its corresponding translation words in the first language. This is not limited to the translation words from the correct translation word pairs identified in step 325, but rather is a separate translation of each of the words in the word pair in the first language into all of its possible translation words. This can be accomplished using a machine readable bilingual dictionary, for example.

Given a word pair in the second language (e.g., Chinese), the set of corresponding collocation mistake word pairs in the first language (e.g., English) is identified by creating a set of combinations of translations of the words from the second language word pair. For example, if a first word of a Chinese word pair has three different English language translation words and a second word of the Chinese word pair had four different English language translation words, twelve separate combinations of translations of the words from the Chinese word pair can be included in the set.

Next, for each set of combinations of translation word pairs in the first language (e.g., in English) corresponding to a word pair in the second language (e.g., Chinese), the correct word pair translation identified in step 325 is removed from the set to create the mistake pattern database. This is shown in FIG. 3 at 335. The database correlates the Chinese (or second language) word pair, the correct translation English (or first language) word pair, and the collocation mistake translation English (or first language) word pairs.

Figure 5:
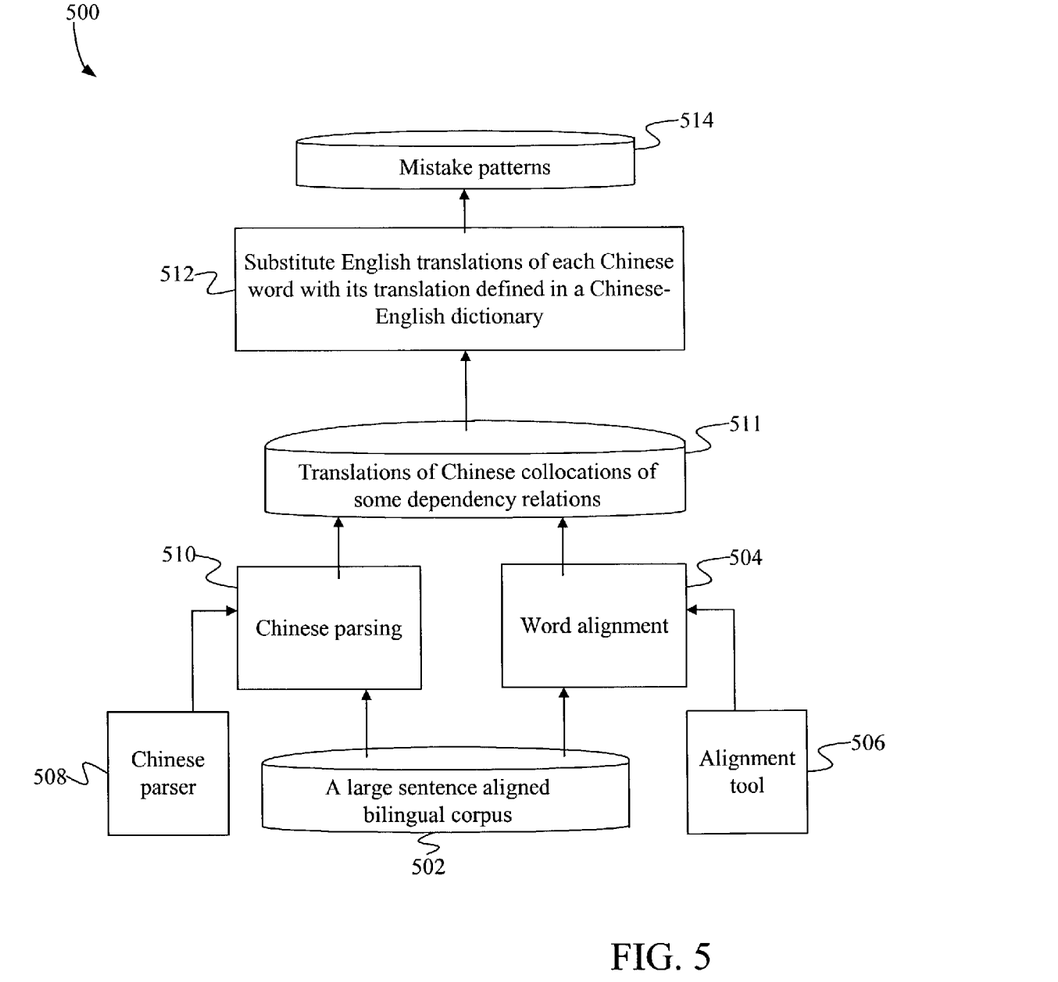
FIG. 5 is a block diagram illustrating a system for constructing a collocation mistake pattern or template database.

A system for creating the mistake pattern database is also disclosed. The system 500 shown in FIG. 5 is described with reference to an example illustrating the above-described method of creating the mistake pattern database. In this example, the process is discussed with regard to a verb-object relation. However, the process can be repeated for other dependency structures as well.

1. Prepare a Large Chinese-English Bilingual Corpus

As discussed above with reference to FIG. 3, a sentence aligned corpus 502 is obtained. However, a bilingual corpus that has not been sentenced aligned can be obtained and sentence alignment can be performed on the corpus if desired.

2. Perform Sentence Alignment and Word Alignment on the Bilingual Corpus

If the corpus is already sentence aligned, only word alignment is necessary. A word alignment component 504 uses an alignment tool 506 to align words between the Chinese sentences and their corresponding English sentences in corpus 502. The word alignment component can be any program, subroutine, module, etc. that uses an alignment tool such as described with reference to FIG. 4 to perform the word alignment. Although a particular alignment tool has been described, word alignment can be performed using any appropriate technique.

For the purposes of this example, consider the bilingual sentence pair:

Chinese: 他在教室里开灯。

English: He turned on the light in the classroom.

3. Dependency Parse the Chinese Sentences

Using a Chinese parser 508 (or more generally a parser for the second language) the Chinese sentences (more generally, the second language sentences) in the corpus are parsed as shown at 510 in order to obtain the dependency structure between words within the sentences. In the example sentences provided above, dependency parsing results in the following word pairs.

Dependency parsing to the Chinese Sentence:

(subject-verb, 他, 开)

(adverb-verb, 在教室里, 开)

(verb-object, 开, 灯)

4. From Chinese Sentences, Extract the Pair of Words with Verb-Object Relations

In the example given above, the pair of words 他, 开 has the subject-verb relation in the Chinese sentence:

他在教室里开灯。.

(subject-verb, 他, 开)

This can be done for any and all desired dependency structure word pairs (to include phrase and word pairs).

5. From the English Sentences, Extract the Translation Subject-Verb Word Pairs Corresponding to the Chinese Subject-Verb Word Pairs Translation extractor 511 is a program, subroutine, module, etc. that, for each Chinese subject-verb word pair in the bilingual corpus, extracts the correct English translation subject-verb word pair from the aligned sentence. Therefore, the translation extractor creates or includes a database of verb-noun Chinese word pairs and their correct English language word pair translations. For example, for the Chinese sentence used in this example, the corresponding English dependency relations are:

(subject-verb, 他, 开)

(subject-verb, he, turn on)

(adverb-verb, 在教室里, 开)

(adverb-verb in the classroom, turn on)

(verb-object, 开, 灯)

(verb-object, turn on, light)

Thus, in this example, we obtain the correct English language verb-noun collocation:

(verb-object, 开, 灯)
(verb-object, turn on, light)

Extracting component 511 can likewise to extract translations of other dependency structure word pairs.

6. For each Verb-Noun Chinese Word Pair, Create a Set of Mistake Verb-Noun English Word Pairs As shown in FIG. 5, an English translation substitution component 512 creates a set of mistake English word pairs which are stored in mistake patterns database 514. This process can be as described with reference to steps 330 and 335 shown in FIG. 5. An illustration of these steps is provided below in a pseudocode format. For each verb-noun Chinese word pair, do:

6.1 Get the top-M English language translations (Ev1, Ev2, . . . Evm) of the Chinese verb, and the top-M English language translations (En1, En2, . . . Enm) of the Chinese noun from a Chinese-English dictionary. English language verb and noun translations for the example are as shown below:

| 开: | 灯: |
|---|---|
| open | light |
| drive | lamp |
| turn on | |
| start | |

As can be seen, if there are less than M translations available, only the available translations will be retrieved.

6.2 Get the set Q of all combinations of a translation of the Chinese verb (V) and a translation of the Chinese noun (N):

$Q=\{(Evi, Enj)|1<=I,j<=n,\}$

Then we get the set Q:
{(open, light), (drive, light), (turn on, light), (start, light), (open, lamp), (drive, lamp),(turn on, lamp), (start, lamp)}

Since 开 has four English translation words or phrases in this example (open, drive, turn on, start), and since 灯 has two English translation words or phrases in this example (light, lamp), there are eight possible combinations.

6.3 Delete the correct combination of an English language verb or verb phrase and an English language noun or noun phrase from the set Q. The correct pair (Vv, Nn) is identified as discussed in step 5 of this example and in step 325 shown in FIG. 3.

Removing the correct pair: (turn on, light), set Q becomes:
{(open, light),(drive, light), (start, light),(open, lamp), (drive, lamp), (turn on, lamp), (start, lamp)}

6.4 For every pair or member (Vx, Ny) remaining in Q, a pattern is defined:
Pattern category: Verb-Noun collocation
Mistake description: (Vx, Ny)
Correction: (Vv, Nn)

Then we can get a series of patterns, for example:
Pattern category: Verb-Noun collocation
Mistake description: (open, light)
Correction: (turn on, light)

After the collocation mistake pattern database is created, it can be used during the writing process to detect collocation mistakes and to provide suggestions using the patterns. The patterns acquired in the database creation process described above with reference to FIGS. 3–5 will be well classified and organized, allowing them to be used efficiently. An example system which uses the mistake pattern or template database 514 to correct collocation mistakes during the process of writing an English language (or more generally a first language) document is shown in FIG. 6.

Figure 6:
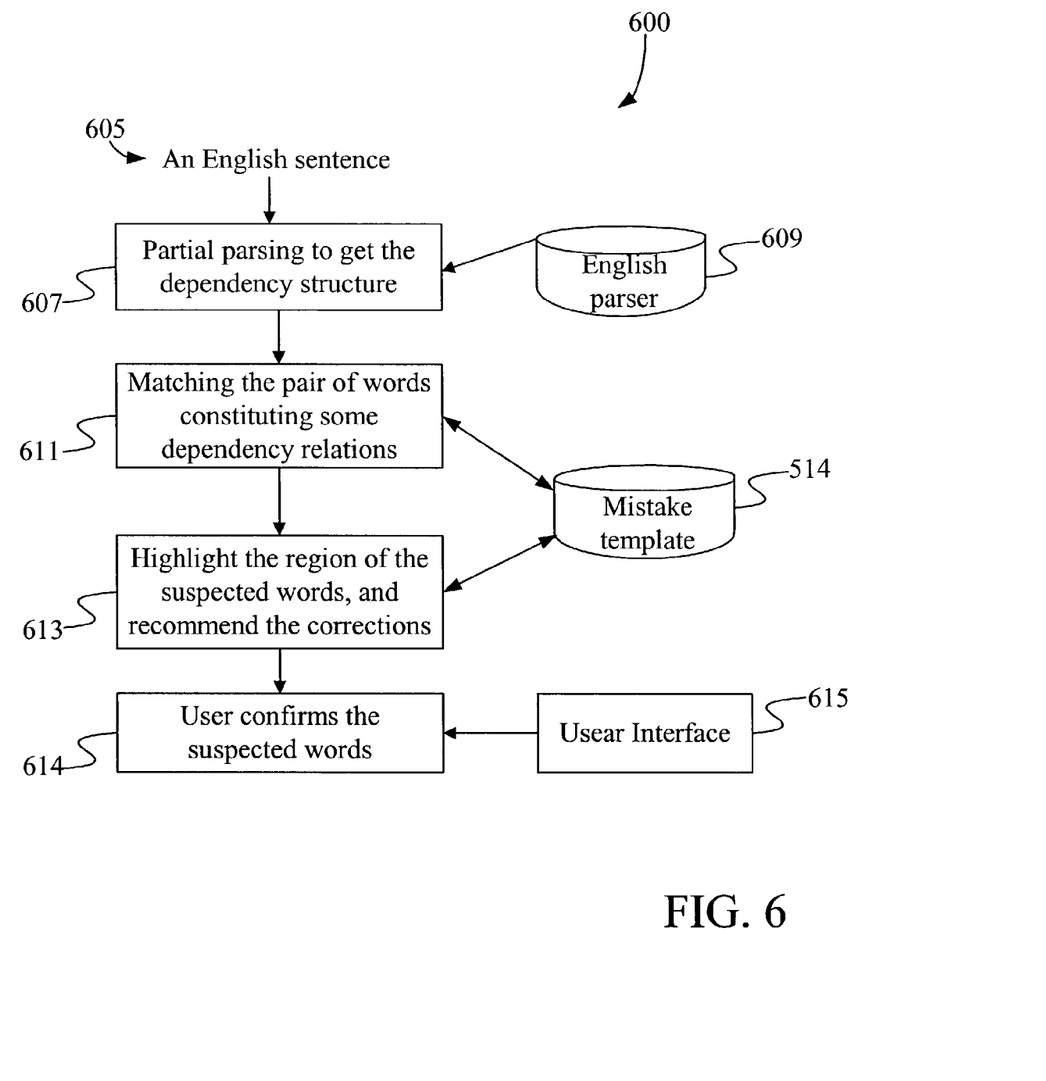
FIG. 6 is a block diagram illustrating a system for correcting collocation mistakes using the mistake pattern or template database created in accordance with present invention.

System 600 shown in FIG. 6 can be embodied in a computing environment such as those shown in FIGS. 1 and 2. As shown in FIG. 6, an input sentence 605 is entered into the system. In this example the input sentence 605 is a sentence in the English language which may contain collocation mistakes. The sentence can be input into the system using any desired mechanism, including using a keyboard 162 or using a microphone 163 (and a speech-to-text conversion program), both of which are shown in FIG. 1. The input sentence can also be entered into the system using other methods, such as importing the sentence from another system or retrieving the sentence from memory.

As shown at component or step 607, an English language parser 609 is used to parse the input English sentence to determine the dependency-structures within the sentence. In the case that entire parsing is not possible because the sentence is too complicated, a partial parse can be used. English parser 609 can be any of a wide number of parsers which are known in the art.

Then, as shown at 611, the word pairs or phrases having dependency structures identified during parsing are matched with the mistake patterns in database 514 created using the method described above. As shown at component or step 613, if a word pair (to include phrases) is found to have a match with a collocation mistake word pair in the database, the area of the suspected collocation mistake word pair can be highlighted in some manner in the written sentence, while the correction collocation suggestion associated in the database with the particular mistake word pair pattern is presented to the writer. In some embodiments, the system will not correct the translation automatically, but will present the suggestion to the writer for consideration. Using a user interface 615 such as a keyboard 162, a pointing device, 161, etc., the user confirms or accept the suggestion, or rejects the suggestion and keeps the original sentence in tact. This is shown at 614.

The following example in which (verb, noun) pairs having the verb-object relation dependency structure are checked for collocation mistakes. This process would be similarly used for other dependency structures as well.

1. Input an English sentence;
He opened the light in the classroom.
2. English dependency parsing;
(subject-verb, he, open)
(adverb-verb, in the classroom, turn on)
(verb-object, open, light)
3. Scan the sentence-for a (verb, noun) pair (open, light) which is of the (Verb-Object) relation;
Example: (open, light)
4. Search the mistake pattern database for a match between the identified (verb, noun) pair (open, light) and a mistake pattern set, if a pattern is matched, then:
a) highlight the (verb, noun) in the English sentence; and
b) output the correction suggestion from the mistake pattern database.

In this particular example, the verb-noun collocation (open, light) will be found to have the following match:

Pattern category: Verb-Noun collocation
Mistake description: (open, light)
Correction: (turn on, light)

Thus, the system will highlight in some manner the area of the collocation mistake, and will suggest the correction.

Although the present invention has been described with reference to particular embodiments, workers skilled in the art will recognize that changes may be made in form and detail without departing from the spirit and scope of the invention. For example, examples described with reference to English language writing by a Chinese speaking person are applicable in concept to writing in a first language by a person whose native language is a second language which is different from the first language. Also, where reference is made to identifying or storing a translation word in a first language for a word in a second language, this reference includes identifying or storing phrases in the first language which correspond to the word in the second language, and identifying or storing a word in the first language which corresponds to a phrase in the second language.

What is claimed is:

1. A method of constructing a collocation mistake pattern database, the method comprising:
    obtaining a bilingual corpus having sentences in first and second languages;
    extracting second language word pairs from the second language sentences in the corpus;
    for each second language word pair extracted from the corpus, extracting a corresponding first language word pair from the corresponding first language sentence in the corpus to determine a correct first language translation for the second language word pair;
    for each second language word pair extracted from the corpus, creating a set of combinations of first language translation words corresponding to the second language word pair; and
    for each second language word pair extracted from the corpus, removing the correct first language translation from the set of combinations of first language translation words such that the set of combinations represent a set of collocation mistake first language word pairs corresponding to the second language word pair.

2. The method of claim 1, wherein obtaining the bilingual corpus further includes obtaining a sentence and word aligned bilingual corpus having sentences in the first and second languages.

3. The method of claim 2, wherein obtaining a sentence and word aligned bilingual corpus further comprises:
    obtaining a sentence aligned bilingual corpus having sentences in the first and second languages; and
    performing word alignment on the bilingual corpus to align words of sentences in the first language with words of corresponding sentences in the second language.

4. The method of claim 2, wherein extracting the second language word pairs from the second language sentences in the corpus further comprises:
    parsing the second language sentences in the corpus to obtain dependency structures between words; and
    extracting the second language word pairs, having a particular dependency structure, from the second language sentences in the corpus.

5. The method of claim 4, wherein creating a set of combinations of first language translation words corresponding to each second language word pair further comprises:
    for each second language word pair extracted from the corpus, separately translating each word of the second language word pair into corresponding translation words in the first language; and
    creating the set of combinations of first language translation words corresponding to each second language word pair by combining each translation of a first word of the second language word pair with each translation of a second word of the second language word pair.

6. The method of claim 4, and for each collocation mistake first language word pair in a set of collocation mistake first language word pairs, further comprising defining a pattern which correlates the collocation mistake first language word pair to the corresponding correct first language translation.

7. The method of claim 6, wherein the pattern further correlates the collocation mistake first language word pair and the corresponding correct first language translation to a pattern category.

8. The method of claim 1, wherein the first language is English and the second language is Chinese.

9. A tangible-computer readable medium having computer-executable instructions for performing steps comprising:
    extracting second language word pairs from the second language sentences in a bilingual corpus;
    for each second language word pair extracted from the corpus, extracting a corresponding first language word pair from the corresponding first language sentence in the corpus to determine a correct first language translation for the second language word pair;
    for each second language word pair extracted from the corpus, creating a set of combinations of first language translation words corresponding to the second language word pair; and
    for each second language word pair extracted from the corpus, removing the correct first language translation from the set of combinations of first language translation words such that the set of combinations represent a set of collocation mistake first language word pairs corresponding to the second language word pair.

10. The tangible-computer readable medium of claim 9, further having computer-executable instructions for performing the step of obtaining the bilingual corpus.

11. The tangible-computer readable medium of claim 10, wherein obtaining the bilingual corpus further includes obtaining a sentence and word aligned bilingual corpus having sentences in the first and second languages.

12. The tangible-computer readable medium of claim 11, wherein obtaining the sentence and word aligned bilingual corpus further comprises:
    obtaining a sentence aligned bilingual corpus having sentences in the first and second languages; and
    performing word alignment on the bilingual corpus to align words of sentences in the first language with words of corresponding sentences in the second language.

13. The tangible-computer readable medium of claim 9, wherein extracting the second language word pairs from the second language sentences in the corpus further comprises:
    parsing the second language sentences in the corpus to obtain dependency structures between words; and extracting the second language word pairs, having a particular dependency structure, from the second language sentences in the corpus.

14. The tangible-computer readable medium of claim 13, wherein creating a set of combinations of first language translation words corresponding to each second language word pair further comprises:
   for each second language word pair extracted from the corpus, separately translating each word of the second language word pair into corresponding translation words in the first language; and
   creating the set of combinations of first language translation words corresponding to each second language word pair by combining each translation of a first word of the second language word pair with each translation of a second word of the second language word pair.

15. The tangible-computer readable medium of claim 13, and for each collocation mistake first language word pair in a set of collocation mistake first language word pairs, further comprising defining a pattern which correlates the collocation mistake first language word pair to the corresponding correct first language translation.

16. The tangible-computer readable medium of claim 15, wherein the pattern further correlates the collocation mistake first language word pair and the corresponding correct first language translation to a pattern category.

17. The tangible-computer readable medium of claim 9, wherein the first language is English and the second language is Chinese.

* * * * *